United States Patent
Vujcic

(10) Patent No.: US 9,049,729 B2
(45) Date of Patent: *Jun. 2, 2015

(54) RANDOM ACCESS CHANNEL PREAMBLE SELECTION

(71) Applicant: LG ELECTRONICS INC., Seoul (KR)

(72) Inventor: Dragan Vujcic, Limours (FR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,183

(22) Filed: Jun. 3, 2014

(65) Prior Publication Data

US 2014/0286261 A1   Sep. 25, 2014

Related U.S. Application Data

(63) Continuation of application No. 12/359,928, filed on Jan. 26, 2009, now Pat. No. 8,879,478.

(60) Provisional application No. 61/048,542, filed on Apr. 28, 2008.

(51) Int. Cl.
| | |
|---|---|
| *H04W 4/00* | (2009.01) |
| *H04W 74/08* | (2009.01) |
| *H04W 74/00* | (2009.01) |

(52) U.S. Cl.
CPC ........ *H04W 74/0833* (2013.01); *H04W 74/004* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 7,013,146 B2 | 3/2006 | Wang et al. | |
| 2005/0271025 A1 | 12/2005 | Guethaus et al. | |
| 2007/0064665 A1 | 3/2007 | Zhang et al. | |
| 2007/0206531 A1 | 9/2007 | Pajukoski et al. | |
| 2007/0263579 A1 | 11/2007 | Ozluturk | |
| 2008/0095185 A1 | 4/2008 | DiGirolamo et al. | |
| 2009/0042582 A1 * | 2/2009 | Wang et al. | 455/450 |
| 2009/0109919 A1 * | 4/2009 | Bertrand et al. | 370/330 |
| 2009/0252125 A1 * | 10/2009 | Vujcic | 370/336 |
| 2010/0069084 A1 | 3/2010 | Parkvall et al. | |
| 2010/0260079 A1 | 10/2010 | Baldemair et al. | |
| 2010/0284350 A1 | 11/2010 | Korhonen et al. | |
| 2011/0110240 A1 * | 5/2011 | Bergquist et al. | 370/241.1 |

FOREIGN PATENT DOCUMENTS

| | | | |
|---|---|---|---|
| WO | WO2007073040 | * | 11/2006 |
| WO | 2007091810 | | 8/2007 |

* cited by examiner

*Primary Examiner* — Mohammad Adhami
(74) *Attorney, Agent, or Firm* — Lee, Hong, Degerman, Kang & Waimey

(57) ABSTRACT

The present invention provides a method of selecting a random access preamble in a radio communication system operable at least on a physical layer and a medium access control layer. Random access preambles are divided into at least two groups, the groups depending on at least one of the following: radio conditions and a size of a message to be transmitted by user equipment. The method comprising: (a) the medium access control layer selecting one of the preamble groups; (b) the medium access control layer randomly selecting one random access preamble within the selected group; (c) the medium access control layer signalling the selected random access preamble to the physical layer; and (d) the physical layer generating and transmitting the generated random access preamble.

12 Claims, 6 Drawing Sheets

RANDOM ACCESS CHANNEL PREAMBLE SELECTION

CROSS-REFERENCE TO RELATED APPLICATIONS

This application is a continuation of U.S. patent application Ser. No. 12/359,928, filed on Jan. 26, 2009, now U.S. Pat. No. 8,879,478, which claims the benefit of U.S. Provisional Application Ser. No. 61/048,542 filed on Apr. 28, 2008, the contents of which are all hereby incorporated by reference herein in their entirety.

BACKGROUND OF THE INVENTION

1. Field of the Invention

The present invention relates to random access channel (RACH) procedure in a cellular communications network, and in particular to selecting RACH preamble sequence. While it is described below in the context of a long term evolution (LTE) type cellular network for illustration purposes and because it happens to be well suited to that context, those skilled in the art will recognise that the invention disclosed herein can also be applied to various other types of cellular networks.

2. Discussion of the Related Art

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The LTE of UMTS is under discussion by the 3rd generation partnership project (3GPP) that standardised UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an evolved packet core (EPC) and one or more user equipment (UE) units 101. The E-UTRAN may include one or more evolved NodeBs (eNodeB, or eNodeB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with UE 101, and may also be referred to as a base station (BS) or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

FIG. 2(a) is a block diagram depicting an architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

FIGS. 2(b) and 2(c) are block diagrams depicting the user plane protocol and the control plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101. The control plane also comprises PDCP between RLC and RRC.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as an RRC_IDLE and an RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where the UE 101 sends a first message to the network is referred to as initial access. For this the common uplink channel called random access channel is used. In most systems the initial access starts from UE with the connection request message including the reason of the request, and the answer from the network indicating the allocation of radio resources for the requested reason. Thus, RACH is an uplink common channel used for transmitting control information and user data. It is applied in random access, and used for low-rate data transmissions from the higher layer.

In 3GPP TS 25.331 there are several reasons, called establishment cause, for sending a connection request message. The following are listed: originating conversational/streaming/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

Reason "originating call" means that the UE 101 wants to setup a connection, for instance a speech connection. Reason "terminating call" means that the UE 101 answers to paging. Reason "registration" means that the user wants to register only to location update.

To send the information over the air the physical random access procedure is used. The physical random access transmission is under the control of higher layer protocol which performs some important functions related to priority and load control. These procedures differ in detail but GSM, UMTS and LTE radio systems have some similarities between them.

The UE 101 selects randomly an access resource and transmits a RACH preamble part of a random access procedure to the network. A preamble is a short signal that is sent before the transmission of the RACH connection request message. The UE 101 repeatedly transmits the preamble by increasing the transmission power every time the preamble is sent until it the network indicates the detection of the preamble. Then the message part is sent at the level of power equal to the last preamble transmission power plus an offset signalled by the network.

From the physical layer perspective, random access procedure includes successful message 1 transmission of one preamble sequence selected among available preamble sequences and message 2 reception of random access response. This is illustrated in FIG. 3. In the following description instead of referring to preamble sequences, simply preambles are referred to, but it is to be understood that they mean the same thing.

Since the UE 101 in good channel conditions supports larger message 3 size than the UE 101 in bad channel conditions, it has been agreed that message 3 is dynamic in size and that the size is conveyed by the preamble in message 1. Therefore, the available preambles are grouped into two sets based on the size of the message 3 to be transmitted on the uplink. The selection of one of the two groups is done depending on the UE radio conditions and the thresholds required for selecting one of the two groups. Then a random access preamble is selected randomly within the selected group. In current systems, such as the UMTS, the random access preamble selection is done by the physical layer due to the fact that RACH retransmission procedure is faster than 10 ms interaction between physical layer (L1) and upper layers (L2/L3).

An object of the present invention is to improve the RACH procedure.

SUMMARY OF THE INVENTION

According to a first aspect of the present invention there is provided a method of selecting a random access preamble in a radio communication system operable at least on a physical layer and a medium access control layer, random access preambles being divided into at least two groups, the groups depending on at least one of the following: radio conditions and a size of a message to be transmitted by user equipment, the method comprising:

the medium access control layer selecting one of the preamble groups;

the medium access control layer randomly selecting one random access preamble within the selected group;

the medium access control layer signalling the selected random access preamble to the physical layer; and the physical layer transmitting the selected random access preamble.

Thus, the L1 is simplified as a result of implementing the teachings of the present invention. L1 complexity is moved to upper layers (L2/L3), and additional complexity in upper layers is negligible. Moreover, the L1 behaviour can be the same for the situations, where ACK is received for the transmitted preamble, no ACK is received or where no preamble is received within a RACH response window. The proposed solution also leads to a substantially independent L1-L2 interaction. In accordance with the present invention, L1 is not aware whether the preamble transmission is first transmission or retransmission. L1 just sends preamble over the air and then after the end of time window response, it passes the received information to L2.

Preamble retransmissions could be based on latest configuration. In UMTS, all access burst retransmissions are based on the first defined configuration. By this proposal, for each preamble retransmission, a parameter, such as the maximum allowed power that UE 101 can set, a target preamble power, PRACH configuration (time and frequency position) and preamble format, obtained in broadcast channel (BCH) can be re-taken into account. This means that the L1 does not transmit by using an old configuration. For instance, if 8 retransmissions are allowed and 1 random access occasion per 10 ms, in prior art solutions UE 101 may transmit by using a configuration which is 80 ms old. The reason for this is the fact that once the RACH procedure is initialised in UMTS, the next L1/L2 interaction is done when the maximum number of retransmissions is reached or ACK or NACK is received. But in LTE, L1/L2 interaction is done for each preamble transmission/retransmission.

According to a second aspect of the present invention there is provided user equipment for selecting a random access preamble in a radio communication system, the user equipment being operable at least on a physical layer and a medium access control layer, random access preambles being divided into at least two groups, the groups depending on at least one of the following: radio conditions and a size of a message to be transmitted by the user equipment, wherein:

the medium access control layer is operable to select one of the preamble groups;

the medium access control layer is operable to randomly select one random access preamble within the selected group;

the medium access control layer is operable to signal the selected random access preamble to the physical layer; and the physical layer is operable to transmit the selected random access preamble.

BRIEF DESCRIPTION THE DRAWINGS

Other objects, features and advantages of the invention will become apparent when reading the following description on non-limiting exemplary embodiments with reference to the accompanying drawings.

FIG. 1 is a block diagram illustrating network structure of an E-UMTS (or LTE) system.

FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

DESCRIPTION OF PREFERRED EMBODIMENTS

Figure 1:
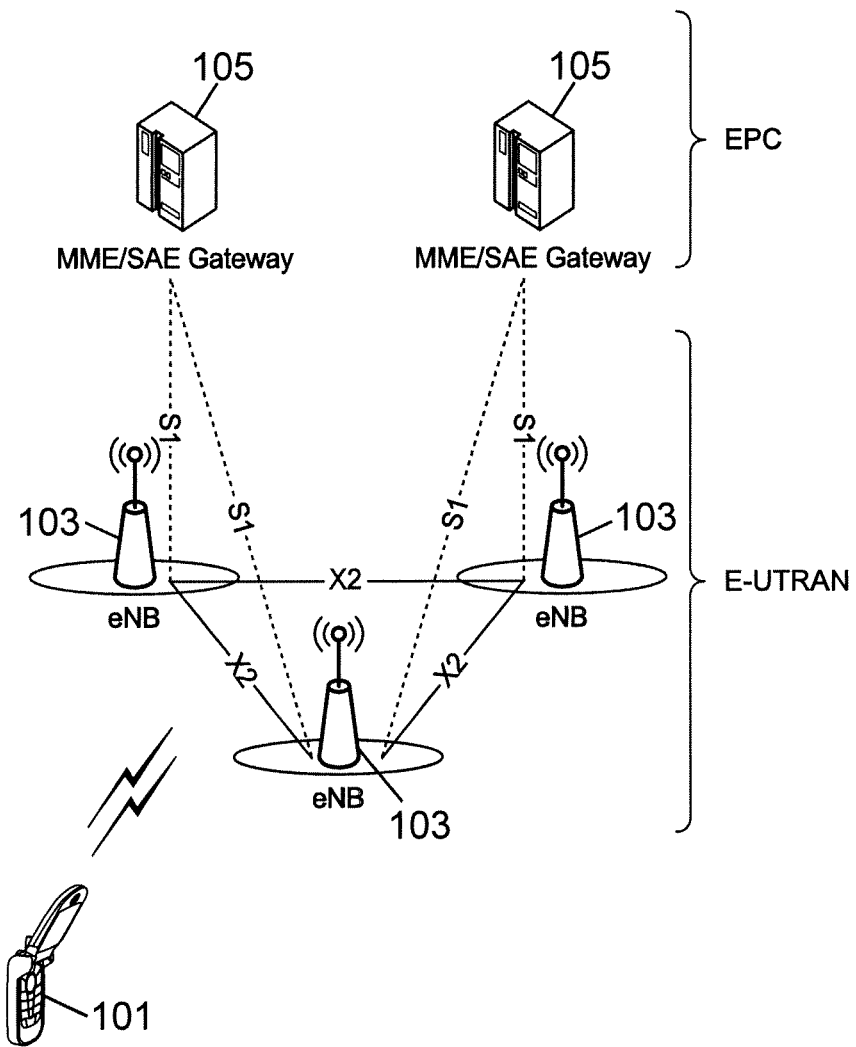
Figure 2A:
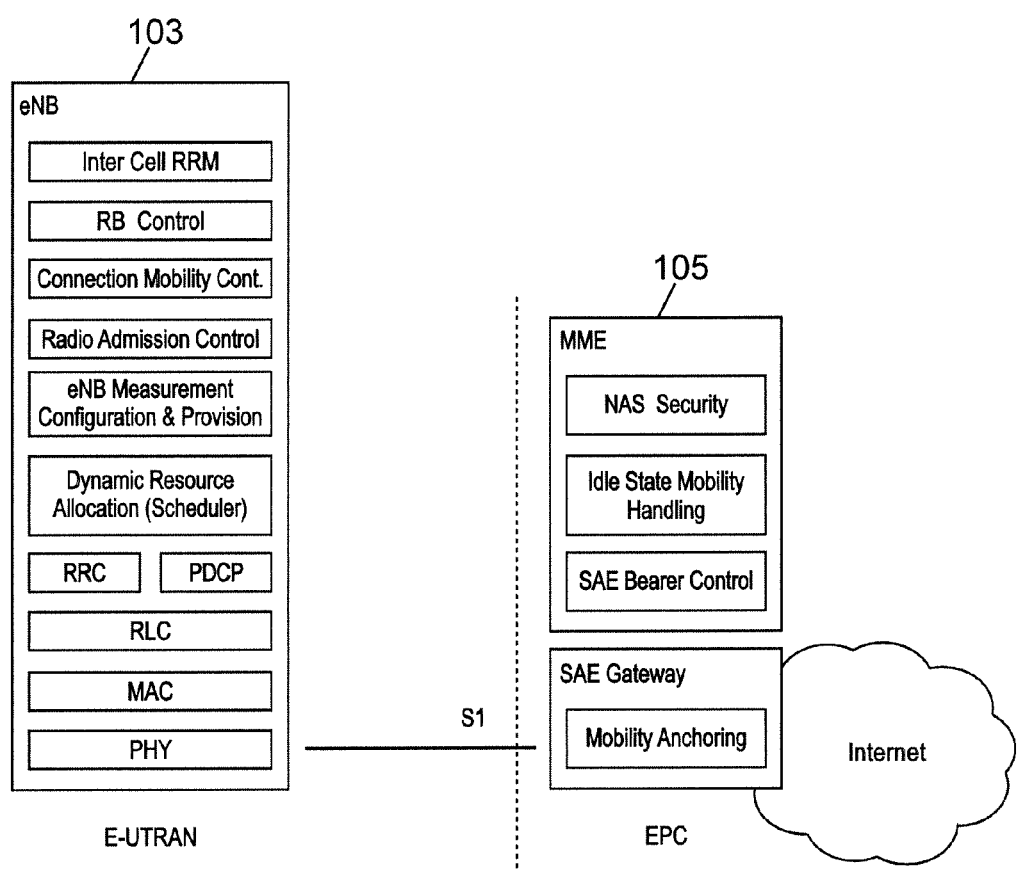
Figure 2B:
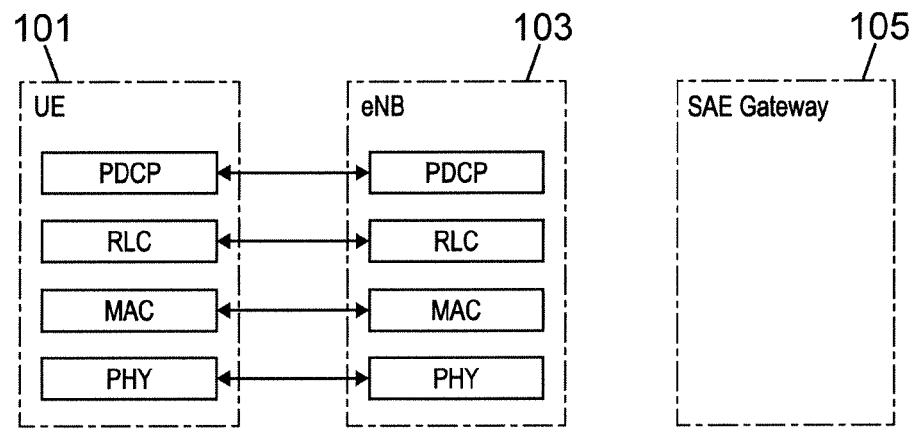
Figure 2C:
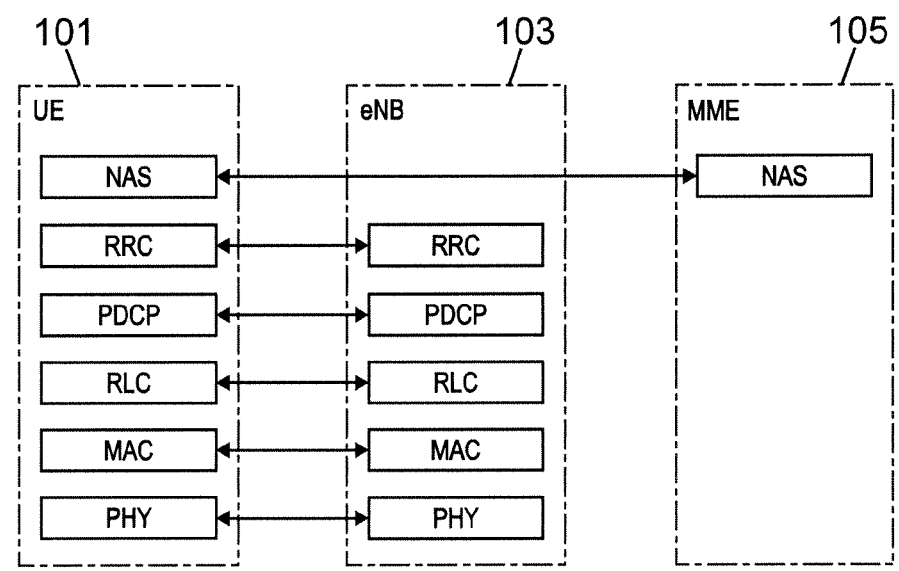
Figure 3:
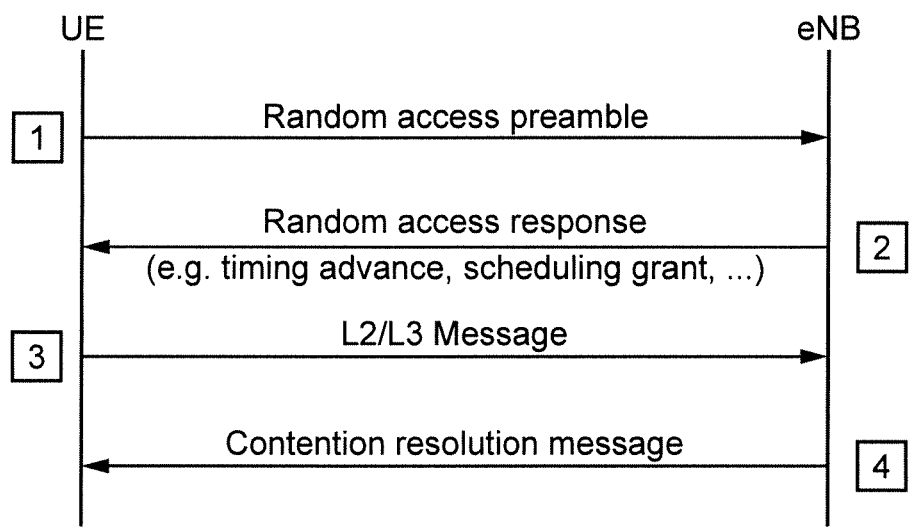
FIG. 3 is a flow chart illustrating the RACH procedure.

Two embodiments of the present invention are next described in more detail with reference to the attached figures. These embodiments are described in the context of LTE, but the invention is by no means limited to this environment.

In LTE the random access procedure is classified into two categories: non-synchronised random access and synchronised random access. Only non-synchronised random access is considered in the following.

The non-synchronised access is used when the uplink connection of the UE 101 is not time synchronised or when the UE 101 loses uplink synchronisation. The non-synchronised access allows the network to estimate and, if needed, to adjust the UE 101 transmission timing. Therefore, the non synchronised random access preamble is at least used for time alignment, and signature detection. The message payload may comprise any additional associated signalling information, e.g., a random ID, pathloss/channel quality indicator (CQI), access purpose, and so forth.

The UE 101 randomly selects a signature out of a group of signatures to distinguish between different UEs that attempt an access simultaneously. The preamble shall have good auto-correlation properties in order for the eNodeB 103 to obtain an accurate timing estimate. In addition, the different preambles should have good cross-correlation properties in order for the eNodeB 103 to distinguish between simultaneous access attempts for different UEs using different signatures. A constant amplitude zero auto-correlation (CAZAC) sequence is used as a preamble signature sequence to achieve good detection probability.

Prior to initiation of the non-synchronised physical random access procedure, Layer 1 shall receive the following information from the higher layers:

Available random access channels (number, frequency position, time period and timing offset);

Available preamble formats and their mapping to implicit messages;

Available Zadoff-Chu (ZC) root sequences and indices;

Initial preamble transmission power;

Power ramping step size (0 dB step size is allowed); and

Maximum number of preamble retransmissions.

From the physical layer perspective, the L1 random access procedure encompasses successful transmission of messages 1 and 2, i.e. random access preamble and random access response, respectively. The remaining messages are scheduled for transmission by the higher layer on a shared data channel and thus not considered part of L1 random access procedure. A random access channel is a 1.08 MHz portion of a subframe or set of consecutive subframes reserved for random access preamble transmissions.

The following steps are required for the L1 random access procedure:

1. Prior to initiation of the non-synchronised physical random-access procedure, L1 shall receive the information indicated above from the higher layers.

2. A random access channel is randomly selected from the available non-synchronised random access channels. A preamble is then randomly selected from the available preamble set based on the implicit message to be transmitted. The random function shall be such that each of the allowed selections is chosen with equal probability.

3. The initial preamble transmission power level (which is set by the MAC) is determined using an open loop power control procedure. The transmission counter is set to the maximum number of preamble retransmissions. Preamble transmission then occurs using the selected random access channel, preamble, and preamble transmission power.

4. If no response (message 2) corresponding to the transmitted preamble (message 1) is detected then another random access channel and preamble are randomly selected. If the maximum transmission power and the maximum number of retransmissions have not been reached, then preamble retransmission occurs. Otherwise the L1 status ("No acknowledgment on non-synchronised random access") is passed to the higher layers (MAC) and the physical random access procedure is exited.

5. If a response (message 2) corresponding to the transmitted preamble (message 1) is detected, then the L1 status ("ACK on non-synchronised random access received") is passed to the higher layers (MAC) and the physical random access procedure is exited.

The following information is assumed to be available before performing a preamble selection:

The logical root sequence index;

The cyclic shift $N_{CS}$ describing the correlation size of a Zadoff-Chu sequence;

The high speed flag for determining whether unrestricted or restricted preamble set shall be used;

The size of the random access preamble groups; and

The threshold required for selecting one of the access preamble groups.

In order to find out which sequence is transmitted by the UE 101, the eNodeB 103 correlates received sequence with each of 64 sequences that are available. For instance, if the Zadoff-Chu sequence is ABCDEF (size is 6 samples), then say that the size of the cyclic shift is 2. It means that the eNodeB 103 and the UE 101 will generate 3 preambles: (AB), (BC), (EF). Then the UE 101 chooses one preamble randomly, e.g. preamble EF. The eNodeB 103 will then correlate the received preamble with all preambles and only correlation with preamble EF will be successful.

Figure 4:
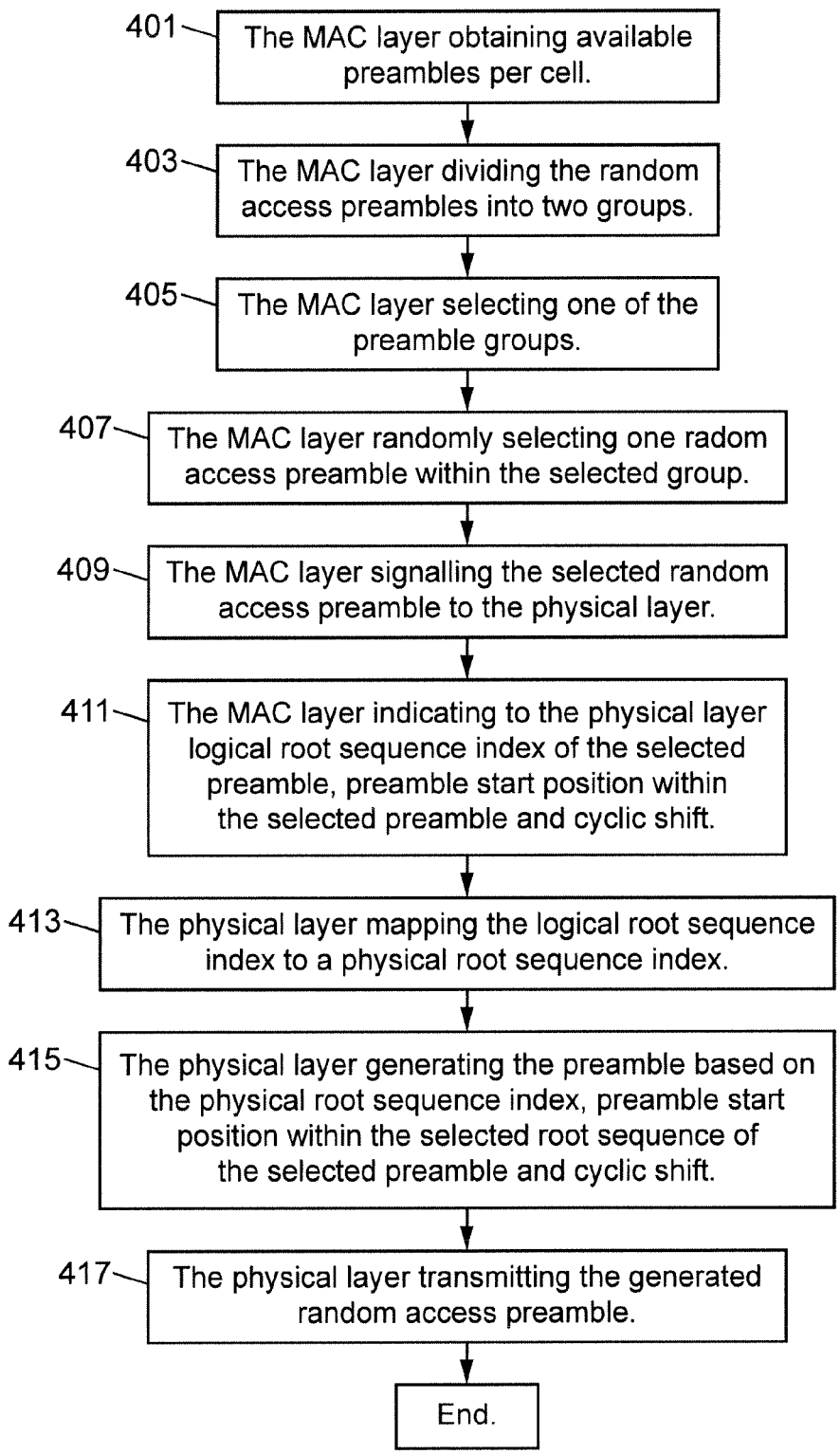
FIG. 4 is a flow chart illustrating a method of random access preamble selection in accordance with a first embodiment of the present invention.

The preamble selection is in current solutions done by L1. However, the present invention proposes a solution where it is done by L2. The first embodiment of the present invention is next described with reference to the flow chart of FIG. 4.

In step 401 a set of available preambles per cell are obtained by L2 according to the equations described in 3GPP TS 36.211 v8.2.0 (2008-03) in Section 5.7.2. There are 64 preambles available in each cell. The set of 64 preambles in a cell is found by including first, in the order of increasing cyclic shift, all the available cyclic shifts of a root Zadoff-Chu sequence with the logical root index broadcast as part of the system information. In case the set of available preambles per cell cannot be obtained from a single root Zadoff-Chu sequence, additional preambles are obtained from the root sequences with the consecutive logical root indexes until all available 64 preambles are obtained.

In step 403 the available preambles are further divided into groups according to the size of random access preamble groups. In this example the number of the generated groups is two. The division depends on at least radio channel conditions and/or message size to be transmitted by the UE 101. In step 405 one of the access preamble groups is selected depending on the size of the message 3 to be transmitted on the UL and on the radio conditions compared to the signalled threshold.

In step 407 the MAC layer selects randomly one random access preamble within the selected group. In step 409 the MAC layer signals the selected random access preamble to the physical layer. In step 411 the MAC layer indicating to the physical layer logical root sequence index of the selected preamble, preamble start position within the logical root sequence index of the selected preamble and cyclic shift. The physical layer then in step 413 maps the logical root sequence index to a physical root sequence index as explained in 3GPP TS 36.211 v8.2.0 (2008-03) in Section 5.7.2. In step 415 the physical layer generates the random access preamble based on the physical root index, start position and cyclic shift. Finally in step 417 the physical layer transmits the generated preamble.

Thus, in the above embodiment the required parameters on L1 for the selected preamble generation are:

The logical root sequence index of the selected preamble;

The preamble start position within the logical root sequence index of selected preamble; and The cyclic shift $N_{CS}$.

Figure 5:
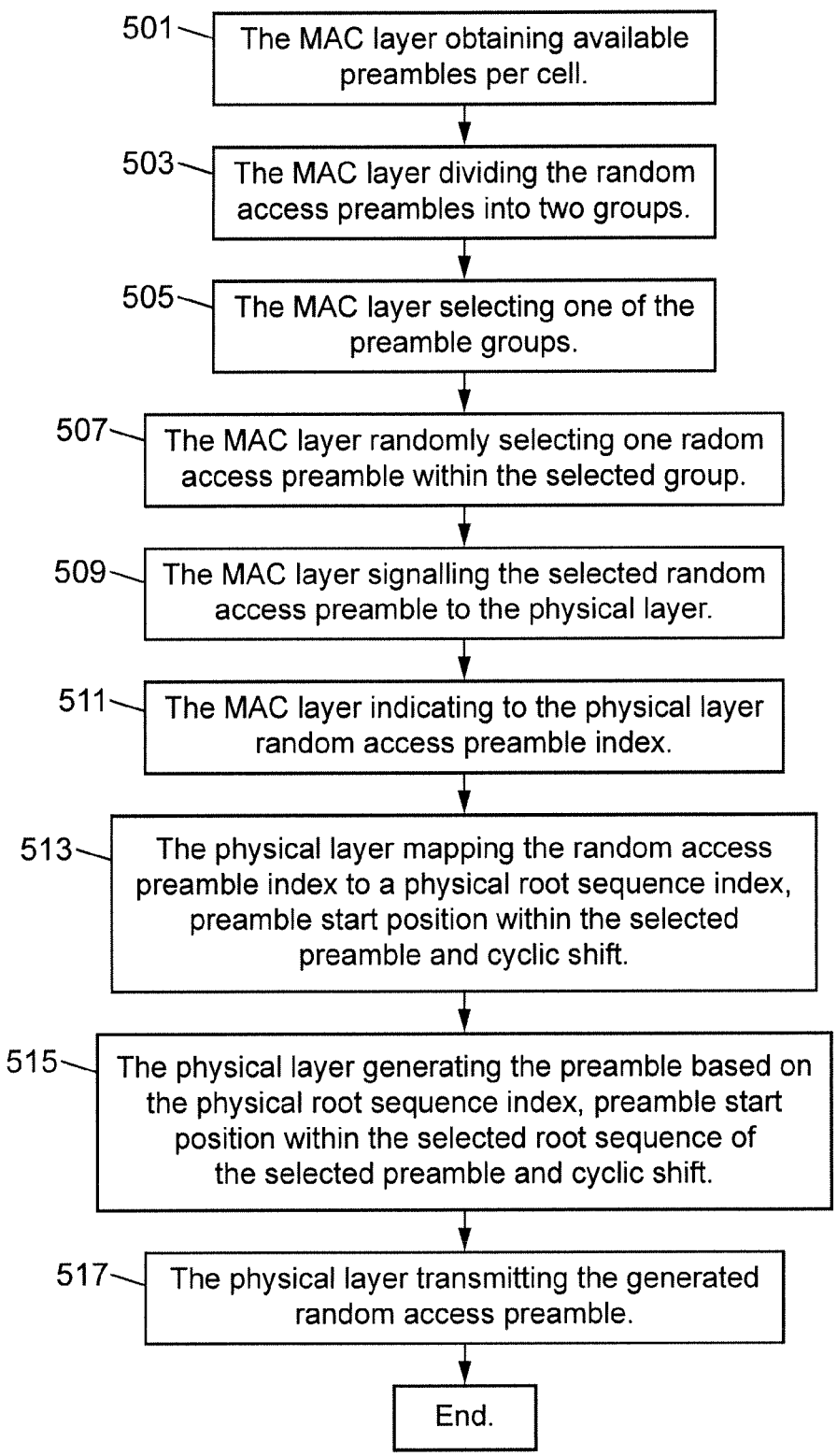
FIG. 5 is a flow chart illustrating a method of random access preamble selection in accordance with a second embodiment of the present invention.

The second embodiment of the present invention is next described with reference to the flow chart of FIG. 5. In this embodiment the required parameters on L1 are different. In this embodiment, steps 501, 503, 505, 507, 509, 515 and 517 are identical to steps 401, 403, 405, 407, 409, 415 and 417, respectively. However, in step 511 the MAC layer indicates to the physical layer only the random access preamble index corresponding to the selected preamble. Then in step 513 the physical layer maps the random access preamble index to a physical root sequence index, preamble start position within the logical root sequence index of the selected preamble and cyclic shift.

Two embodiments of the present invention have been disclosed above in the illustrative case of a 3GPP LTE system. Those skilled in the wireless communication art will appreciate that various modifications can be brought to these embodiments without departing from the invention and from the attached claims. They will also appreciate that the invention is applicable to communications systems other than 3GPP LTE systems.

What is claimed is:

1. A method of performing a random access procedure by a User Equipment (UE) in a radio communication system, the method comprising:

a Layer 2 (L2) of the UE selecting one of preamble groups according to at least radio conditions or a size of a message to be transmitted;

the L2 of the UE randomly selecting a random access preamble within the selected preamble group;

the L2 of the UE indicating a preamble index to a Layer 1 (L1) of the UE, the preamble index corresponding to the selected random access preamble;

the L1 of the UE selecting a random access preamble sequence using the preamble index; and the L1 of the UE transmitting the selected random access preamble sequence.

2. The method of claim 1, wherein the L2 is a Medium Access Control (MAC) layer, and the L1 is a Physical (PHY) layer.

3. The method of claim 1, further comprising the L2 of the UE indicating at least one of following parameters to the L1 of the UE:
- a logical root sequence index of the selected random access preamble,
- a preamble start position within a selected logical root sequence index of the selected random access preamble, and
- a cyclic shift describing a correlation size of a Zadoff-Chu sequence.

4. The method of claim 3, further comprising the L1 of the UE mapping the selected logical root sequence index to a physical root sequence index.

5. The method of claim 1, further comprising the L1 of the UE mapping the preamble index to at least one of a physical root sequence index, a preamble start position within a selected logical root sequence index, and a cyclic shift describing a correlation size of a Zadoff-Chu sequence.

6. The method of claim 1, wherein the random access procedure is a non-synchronized random access procedure.

7. A User Equipment (UE) configured to perform a random access procedure in a radio communication system, the UE comprising:
- a controller configured to:
  - control a Layer 2 (L2) to select one of preamble groups according to at least a radio condition or a size of a message to be transmitted;
  - control the L2 to randomly select one a random access preamble within the selected preamble group;
  - control the L2 to indicate a preamble index to a Layer (L1), the preamble index corresponding to the selected random access preamble;
  - control the L1 to select a random access preamble sequence using the preamble index; and
  - control the L1 to transmit the selected random access preamble sequence.

8. The UE of claim 7, wherein the L2 is a Medium Access Control (MAC) layer, and the L1 is a Physical (PHY) layer.

9. The UE of claim 7, wherein the controller is further configured to control the L2 to indicate at least one of following parameters to the L1:
- a logical root sequence index of the selected random access preamble,
- a preamble start position within a selected logical root sequence index of the selected random access preamble, and
- a cyclic shift describing a correlation size of a Zadoff-Chu sequence.

10. The UE of claim 9, wherein the controller is further configured to control the L1 to map the selected logical root sequence index to a physical root sequence index.

11. The UE of claim 7, wherein the controller is further configured to control the L1 to map the preamble index to at least one of a physical root sequence index, a preamble start position within a selected logical root sequence index, and a cyclic shift describing a correlation size of a Zadoff-Chu sequence.

12. The UE of claim 7, wherein the random access procedure is a non-synchronized random access procedure.

* * * * *